(12) United States Patent
Miyao (10) Patent No.: US 11,796,855 B2
(45) Date of Patent: Oct. 24, 2023

(54) DISPLAY APPARATUS

(71) Applicant: Japan Display Inc., Tokyo (JP)

(72) Inventor: Makoto Miyao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/109,341

(22) Filed: Feb. 14, 2023

(65) Prior Publication Data

US 2023/0266615 A1    Aug. 24, 2023

(30) Foreign Application Priority Data

Feb. 18, 2022  (JP) ................................. 2022-024160

(51) Int. Cl.
  *G02F 1/1335* (2006.01)
  *G02F 1/13357* (2006.01)
(52) U.S. Cl.
  CPC .. *G02F 1/133524* (2013.01); *G02F 1/133603* (2013.01); *G02F 1/133605* (2013.01)
(58) Field of Classification Search
  None
  See application file for complete search history.

(56) References Cited

U.S. PATENT DOCUMENTS

2021/0096406 A1\* 4/2021 Miyao ............... G02F 1/133342
2021/0223465 A1   7/2021 Numata et al.

FOREIGN PATENT DOCUMENTS

JP        2020-060682 A      4/2020

\* cited by examiner

*Primary Examiner* — Phu Vu
(74) *Attorney, Agent, or Firm* — Michael Best & Friedrich LLP (57) ABSTRACT

A display panel includes a light guide plate fixed on a rear surface of a substrate via an adhesive layer, and a light guide plate fixed on a front surface of a substrate via an adhesive layer, a light source unit having light emitting diode elements, arranged on the rear surface of the substrate, and arranged at a position facing a side surface of the light guide plate, and a light source unit having a plurality of light emitting diode elements, arranged on the front surface of the substrate, and arranged at a position facing a side surface of the light guide plate. Refractive index of one of the adhesive layer and the adhesive layer is lower than refractive index of the other. The side surface of the light guide plate and the side surface of the light guide plate are on the same side in a first direction.

8 Claims, 8 Drawing Sheets

DISPLAY APPARATUS

CROSS-REFERENCE TO RELATED APPLICATION

The present application claims priority from Japanese Patent Application No. 2022-024160 filed on Feb. 18, 2022, the content of which is hereby incorporated by reference into this application.

TECHNICAL FIELD OF THE INVENTION

The present invention relates to a display apparatus using a liquid crystal layer.

BACKGROUND OF THE INVENTION

As a display apparatus using a liquid crystal layer, there is a transparent display apparatus in which an observer can superimpose and recognize a display image and a background by improving light transmittance of substrates sandwiching the liquid crystal layer (see Japanese Patent Application Laid-Open No. 2020-60682 (Patent Document 1)).

SUMMARY OF THE INVENTION

The inventor(s) of the present application has developed a transparent display apparatus that allows an observer to superimpose and recognize a display image and a background. For the transparent display apparatus, each of front and rear surfaces must have properties of transmitting visible light. Therefore, a light source portion for displaying an image is arranged on a side surface of a light guide plate. According to the studies of the inventor of the present application, it is found that the following problems occur when the light source portion is arranged so as to oppose a side surface of the light guide plate. In other words, it is found that a luminance distribution in a display region is not constant and luminance decreases in regions far from the light source portion.

An object of the present invention is to provide a technique for improving performance of a transparent display apparatus.

A display apparatus according to one aspect of the present invention includes: a first substrate having a first front surface and a first rear surface opposite to the first front surface; a second substrate having a second rear surface facing the first front surface and a second front surface opposite to the second rear surface; a liquid crystal layer disposed between the first front surface of the first substrate and the second rear surface of the second substrate; a first light guide plate bonded and fixed to the first rear surface of the first substrate via a first adhesive layer; a second light guide plate bonded and fixed to the second front surface of the second substrate via a second adhesive layer; a first light source unit having a plurality of first light emitting diode elements, arranged on the first rear surface of the first substrate, and arranged at a position facing a first side surface of the first light guide plate; and a second light source unit having a plurality of second light emitting diode elements, arranged on the first front surface of the first substrate, and arranged at a position facing a second side surface of the second light guide plate. Refractive index of one of the first adhesive layer and the second adhesive layer is lower than the refractive index of the other. The first side surface of the first light guide plate and the second side surface of the second light guide plate are on the same side in a first direction.

DESCRIPTION OF THE PREFERRED EMBODIMENTS

Each embodiment of the present invention will be described below with reference to the drawings. Incidentally, the disclosure is merely an example, and any appropriate modifications that those skilled in the art can easily arrive at while maintaining the gist of the invention will be naturally included within the scope of the present invention. In addition, in order to make the description clearer, the drawings may schematically show the width, thickness, and shape, etc. of each part as compared with the actual embodiment. However, this is only an example, and the interpretation of the present invention is not intended to be limited. Further, in this specification and each figure, the same or related reference numerals may be denoted to elements similar to those described above with respect to the previous figures, and a detailed description thereof may be omitted as appropriate.

In the following embodiments, as an example of a display panel used in combination with a glass plate, a liquid crystal display apparatus that displays an image(s) by utilizing scattering of visible light by liquid crystal molecules will be described.

Further, a liquid crystal display apparatus is an apparatus that forms a display image by changing orientations of molecules contained in a liquid crystal layer, but it requires a light source. In embodiments described below, a light source is provided separately from the display panel. Therefore, the display panel and a light source module that supplies visible light to the display panel will be described separately below.

<Transparent Display Panel>

Figure 1:
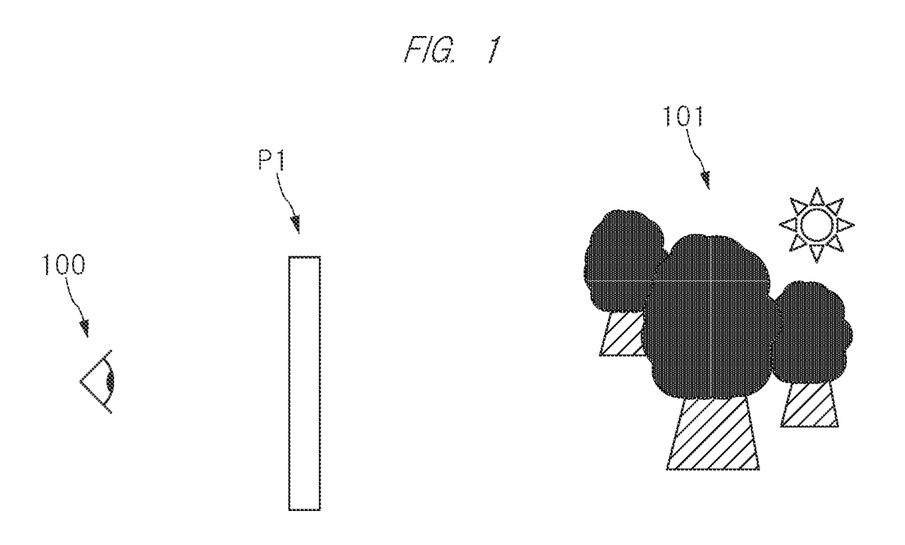
FIG. 1 is an explanatory diagram showing a positional relationship when a viewer on one side of a transparent display panel apparatus visually recognizes a background on its opposite side through the transparent display panel apparatus.
Figure 2:
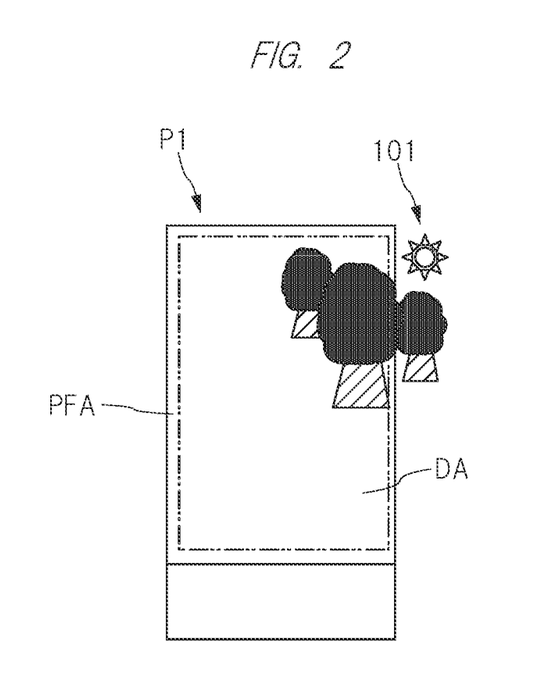
FIG. 2 is an explanatory diagram showing an example of a background visually recognized through the transparent display panel apparatus.

First, characteristics of a so-called transparent display panel will be described. FIG. 1 is an explanatory view showing a positional relationship when a viewer on one side of a transparent display panel visually recognizes a background on the opposite side through the transparent display panel. FIG. 2 is an explanatory diagram showing an example of the background visually recognized through the transparent display panel.

As shown in FIG. 1, when an observer 100 views a display panel P1 from one side to the other side, a background 101 is visually recognized through the display panel P1. As shown in FIG. 2, when both a display region DA and a peripheral region PFA outside the display region DA transmit light, the entire background 101 can be visually recognized without discomfort. Meanwhile, when the peripheral region PFA has a light-shielding property that does not transmit light, a portion of the background 101 visually recognized through the display panel P1 is blocked by the peripheral region PFA, so that this may make the observer feel uncomfortable. Thus, in a case of the display panel P1 which is a transparent display panel, it is preferable that each of the display region DA and the peripheral region PFA has visible light transmittance. Moreover, from the viewpoint of visually recognizing the background 101 without discomfort, it is particularly preferable that each visible light transmission characteristics of the display region DA and the peripheral region PFA is approximately the same.

Figure 3:
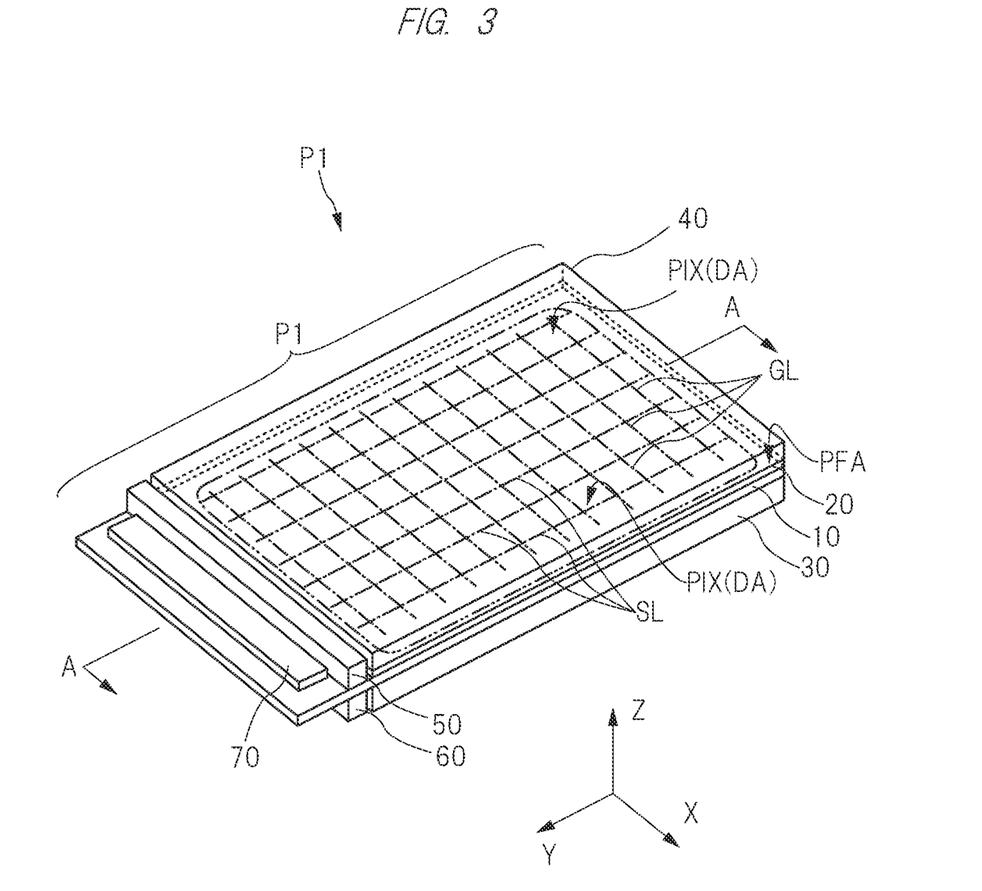
FIG. 3 is a perspective view showing an example of a transparent display panel shown in FIG. 1.
Figure 4:
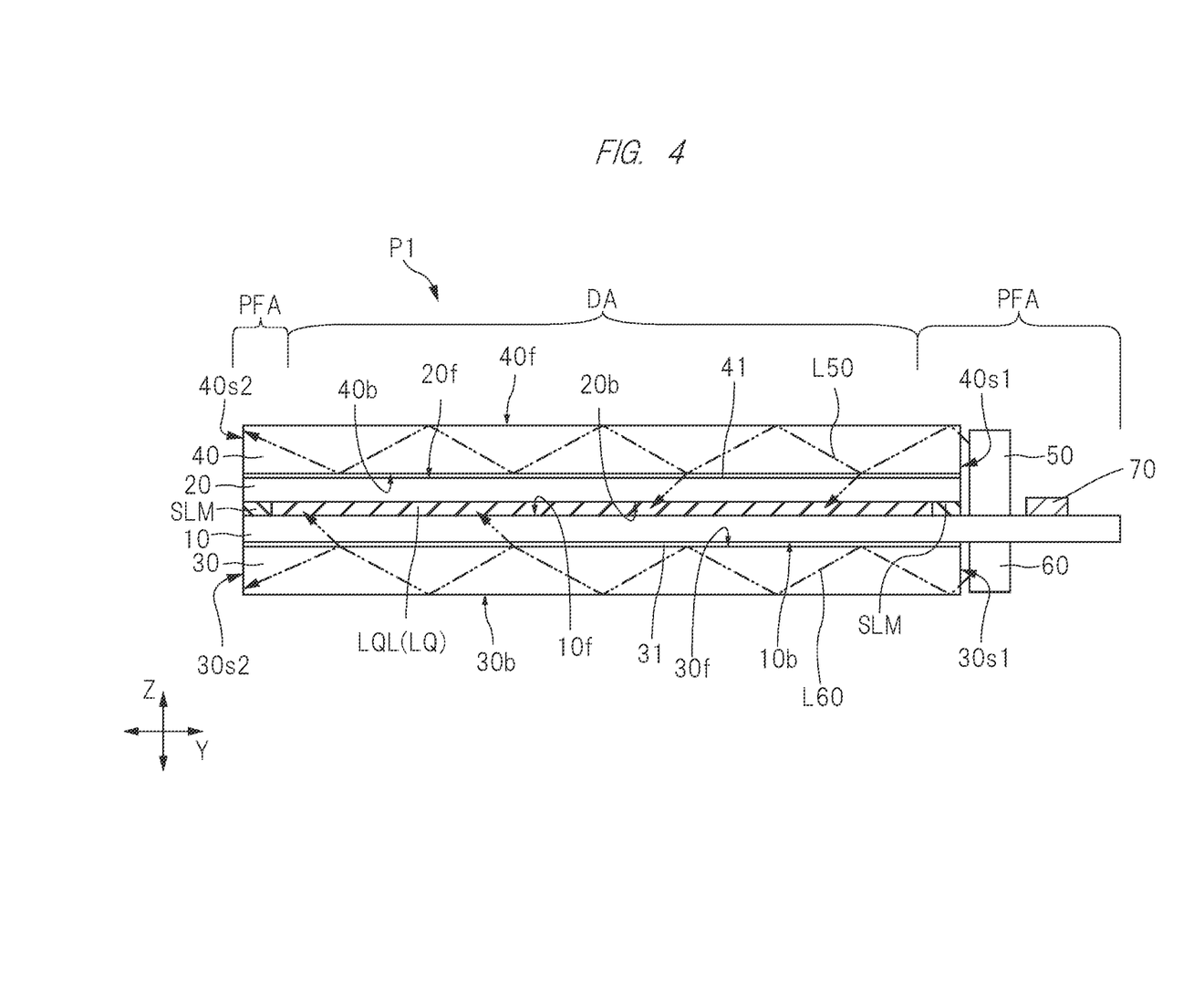
FIG. 4 is a sectional view taken along line A-A in FIG. 3.
Figure 5:
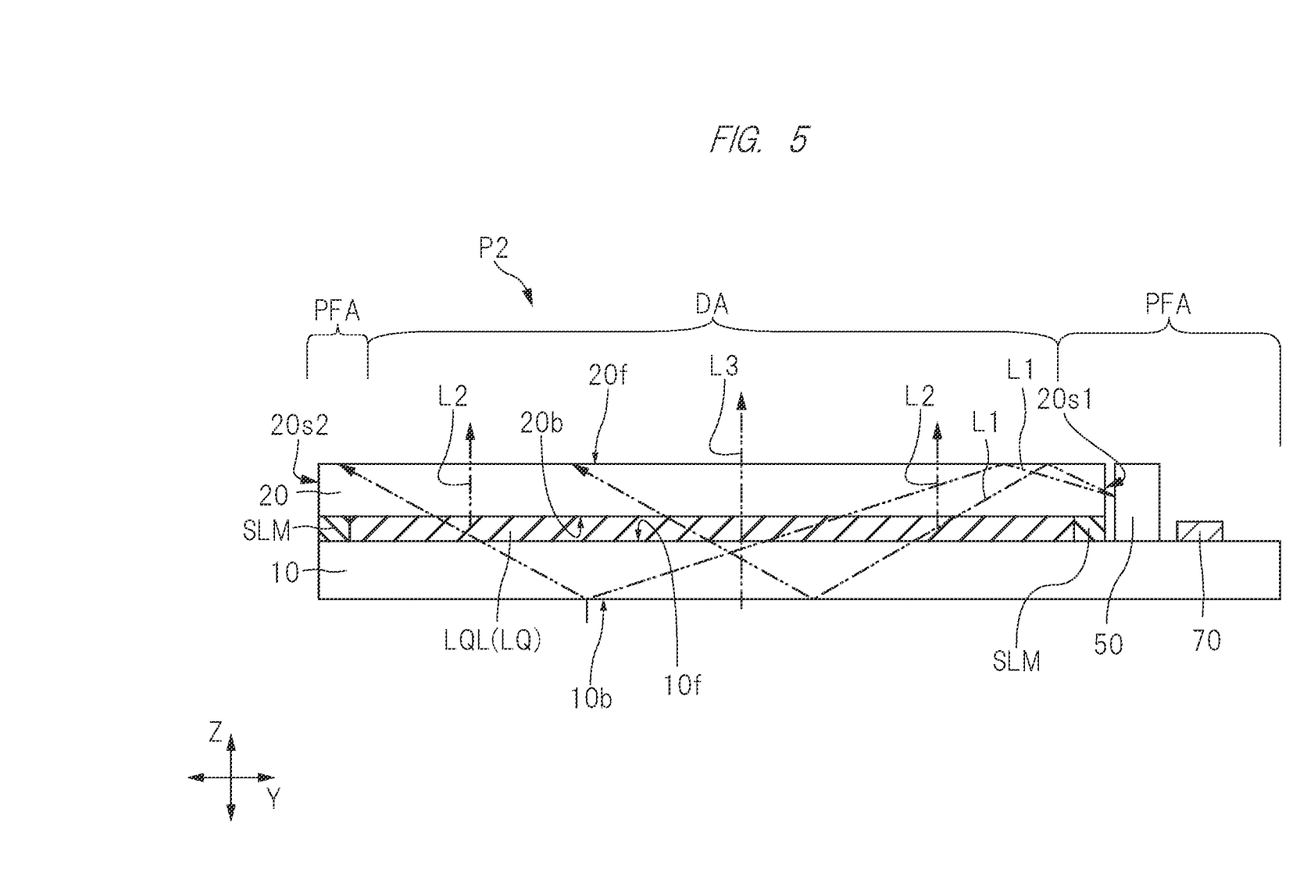
FIG. 5 is an explanatory diagram schematically showing a path of light emitted from a light source portion of a transparent display apparatus that is a study example.

FIG. 3 is a perspective view showing an example of a transparent display panel shown in FIG. 1. In FIG. 3, a boundary between the display region DA and the peripheral region PFA is shown by dash-double-dot lines. In FIG. 3, part of signal wirings, which transmit signals for driving a liquid crystal (more specifically, gate line GL and source line SL), among circuits included in the display panel P1 is schematically shown by dash-single-dot lines. In the following drawings including FIG. 3, the description is made by assuming that a direction along a thickness direction of the display panel P1 is a Z direction and, in a X-Y plane orthogonal to the Z direction, an extending direction of one side of the display panel P1 is an X direction and a direction intersecting with the X direction is a Y direction. FIG. 4 is a sectional view taken along line A-A of FIG. 3. FIG. FIG. 5 is an explanatory diagram schematically showing a path of light emitted from a light source portion of a transparent display apparatus that is a study example.

As shown in FIG. 3, a display panel P1 of the present embodiment includes a substrate (array substrate) 10, a substrate (counter substrate) 20, a light guide plate (also referred to as a first light guide plate or a first cover glass) 30, a light guide plate (also referred to as a second light guide plate or a second cover glass) 40, a light source portion (first light source portion) 50, a light source portion (second light source portion) 60, and a drive circuit 70.

When the present embodiment is configured as a display apparatus, it may include, for example, a control circuit, a flexible substrate connected to the display panel P1, a housing, or the like besides respective components of the display panel P1 shown in FIG. 3. In FIG. 3, illustration of portions other than the display panel P1 is omitted.

The display panel P1 has a display region DA in which an image is formed according to an input signal supplied from outside, and a peripheral region (frame region) PFA surrounding the display region DA. Incidentally, although the display region DA of the display panel P1 shown in FIG. 3 is rectangular, the display region may have a shape other than a rectangular shape such as a polygon or a circle. The display region DA is an effective region in which the display panel P1 displays an image in a plan view of a display surface. Each of the substrate 10, the substrate 20, the light guide plate 30, and the light guide plate 40 is positioned to overlap the display region DA in a plan view. In an example shown in FIG. 1, each of the light source portion 50, the light source portion 60, and the drive circuit 70 is mounted on the substrate 10, but as a modification example, a unshown light source substrate may be attached to the peripheral region PA of the substrate 10 separately from the substrate 10, and the light source portion 50 and the light source portion 60 may be mounted on the unshown light source substrate.

First, an optical path of light emitted from the light source portion 50 in the display panel P1 shown in FIG. 3 will be described. For ease of understanding, the display panel P2 having a simplified structure as shown in FIG. 5 will be used for explanation. Incidentally, a display panel P2 shown in FIG. 5 is the same as the display panel P1 shown in FIG. 4 except for the point that it does not have the light guide plate 30 and the light guide plate 40 and does not have the light source portion 60. Therefore, the following description of the display panel P2 can also be applied to the display panel P1 shown in FIG. 4

As shown in FIG. 5, the display panel P2 has a substrate and a substrate 20 that are bonded to face each other with a liquid crystal layer LQL interposed therebetween. The substrate and the substrate 20 are arranged in the Z direction which is a thickness direction of the display panel P2. In other words, the substrate 10 and the substrate 20 face each other in the thickness direction (Z direction) of the display panel P2. The substrate 10 has a front surface (principal surface, surface) 10f facing the liquid crystal layer LQL (and the substrate 20). The substrate 20 also has a rear surface (main surface, surface) 20b facing the front surface 10f of the substrate 10 (and the liquid crystal layer LQL). The substrate 10 is an array substrate in which a plurality of transistors (transistor elements) as switching elements (active elements) Tr (see FIG. 6) are arranged in an array. Further, the substrate 20 is a substrate provided on a display surface side. The substrate 20 can be rephrased as a counter substrate in the sense of being a substrate arranged opposite to the array substrate.

The liquid crystal layer LQL containing liquid crystals LQ is between the front surface 10f of the substrate 10 and the rear surface 20b of the substrate 20. The liquid crystal layer LQL is an optical modulation element. The display panel P2 has a function of controlling a state of an electric field formed around the liquid crystal layer LQL via the above-mentioned switching elements to modulate the light passing therethrough. The display region DA on the substrate 10 and the substrate 20 overlaps the liquid crystal layer LQL as shown in FIG. 5.

Also, the substrate 10 and the substrate 20 are bonded via a sealing portion (sealing material) SLM. As shown in FIGS. 3 and 5, the sealing portion SLM (see FIG. 5) is arranged in the peripheral region PFA so as to surround the display region DA. Inside the sealing portion SLM, there is a liquid crystal layer LQL as shown in FIG. 5. The sealing portion SLM plays a role as a seal for sealing the liquid crystal between the substrate 10 and the substrate 20. In addition, the sealing portion SLM plays a role as an adhesive that bonds the substrate 10 and the substrate 20 together.

The light source portion 50 is arranged at a position facing a side surface 20s1 of the substrate 20. As schematically shown by dash-double-dot lines in FIG. 5, light-source light L1 emitted from the light source portion 50 propagates away from the side surface 20s1 while being reflected by a rear surface 10b of the substrate 10 and a front surface 20f of the substrate 20. In a propagation path of the light-source light L1, the rear surface 10b of the substrate 10 and the front surface 20f of the substrate 20 are interfaces between a medium with a large refractive index and a medium with a small refractive index. Therefore, when an incident angle at which the light-source light L1 is incident on the front surface 20f and the rear surface 10b is larger than the critical angle, the light-source light L1 is totally reflected at the front surface 20f and the rear surface 10b.

The liquid crystal LQ is a polymer-dispersed liquid crystal LC (see FIG. 6) and contains a liquid crystalline polymer and liquid crystal molecules. The liquid crystalline polymer is formed in a striped shape, and the liquid crystal molecules are dispersed in gaps of the liquid crystalline polymer. Each of the liquid crystalline polymer and the liquid crystal molecules has optical anisotropy or refractive index anisotropy. Responsiveness of liquid crystalline polymers to an electric field is lower than responsiveness of liquid crystal molecules to the electric field. An orientation direction of the liquid crystalline polymer hardly changes regardless of the presence or absence of the electric field. Meanwhile, an orientation direction of the liquid crystal molecules changes according to the electric field when a voltage higher than a threshold value is applied to the liquid crystal LQ. When no voltage is applied to the liquid crystal LQ, respective optical axes of the liquid crystalline polymer and the liquid crystal molecules are parallel to each other and the light-source light L1 incident on the liquid crystal layer LQL is hardly scattered within the liquid crystal layer LQL and is transmissive (transparent state). When a voltage is applied to the liquid crystal LQ, the respective optical axes of the liquid crystal polymer and the liquid crystal molecules cross each other and the light-source light L1 incident on the liquid crystal LQ is scattered within the liquid crystal layer LQL (scattered state). The display panel P2 controls the transparent state and the scattered state by controlling the orientation of the liquid crystal LQ in a propagation path of the light-source light L1. In the scattered state, the light-source light L1 is emitted as emitted light L2 from a front surface 20f side to an outside of the display panel P2 by the liquid crystal LQ. Further, background light L3 incident from a rear surface 10b side passes through the substrate 10, the liquid crystal layer LQL, and the substrate 20, and is emitted to an outside from the front surface 20f. The emitted light L2 and the background light L3 are visually recognized by an observer on the front surface 20f side. The observer can recognize the emitted light L2 and the background light L3 in combination. The display panel in which an observer can recognize the display image and background superimposed in this way is called a transparent display panel.

<Configuration Example of Circuit>

Figure 6:
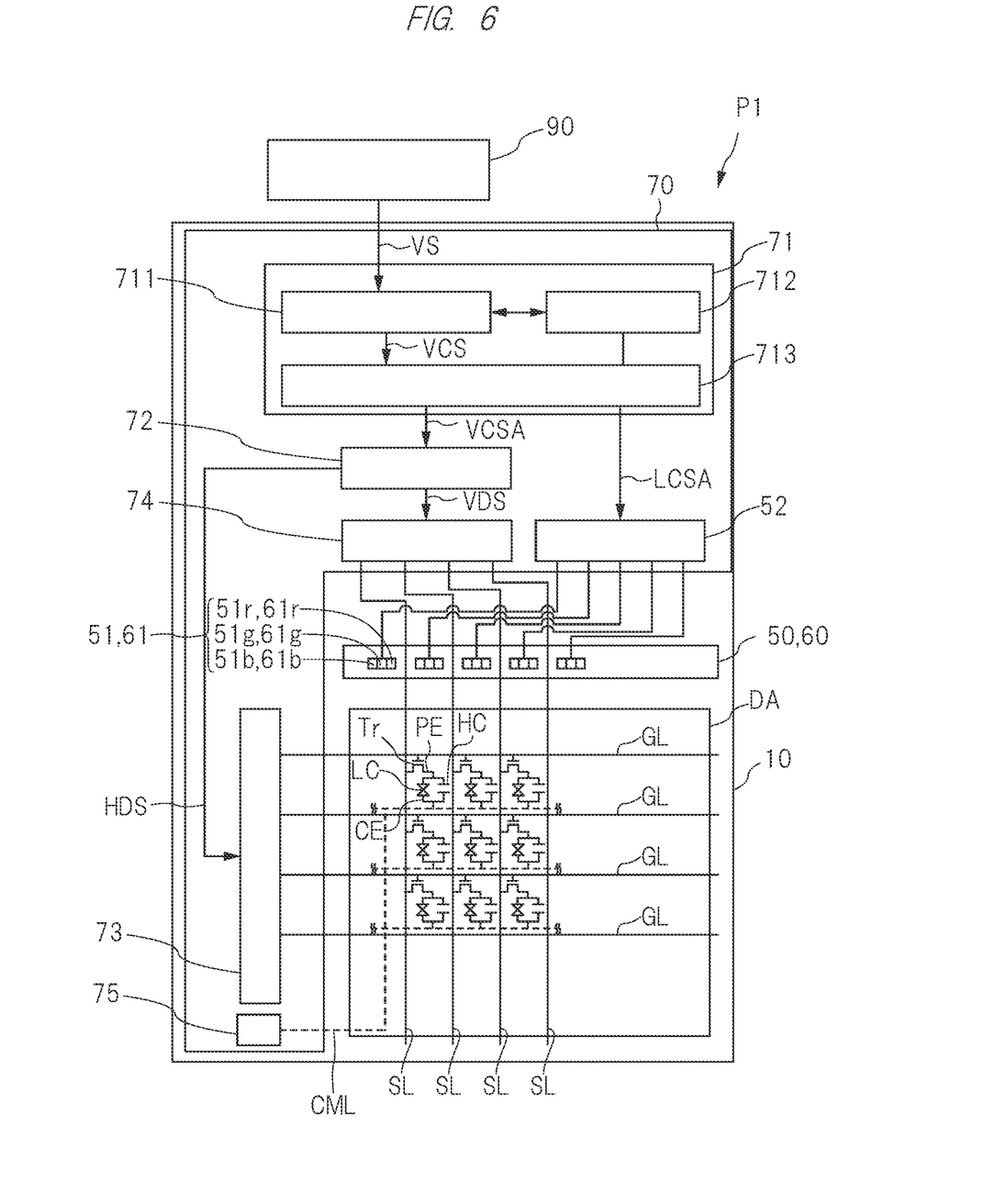
FIG. 6 is a circuit block diagram showing an example of a circuit included in a display panel of FIG. 3.

Next, a configuration example of a circuit included in the display panel P1 shown in FIG. 3 will be described. FIG. 6 is a circuit block diagram showing an example of a circuit included in the display panel of FIG. 3. A wiring path connected to a common electrode CE shown in FIG. 6 is formed on the substrate shown in FIG. 5, for example. In FIG. 6, a wiring(s) formed on the substrate 20 is illustrated by dotted lines. In an example shown in FIG. 6, a light source control unit 52 is included in the drive circuit 70. As a modification example, the light source unit 50, the light source unit 60, and the light source control unit 52 may be provided separately from the drive circuit 70. As described above, when a unshown light source substrate is attached to the peripheral region PA of the substrate 10 shown in FIG. 3 separately from the substrate 10, and the light source unit 50 and the light source unit 60 are mounted on the unshown light source substrate. In this case, the light source control unit 52 is formed, for example, on a unshown light source substrate. Alternatively, the light source control unit 52 is formed in an electronic component mounted on a unshown light source substrate.

In the example shown in FIG. 6, the drive circuit 70 includes a signal processing circuit 71, a pixel control circuit 72, a gate drive circuit 73, a source drive circuit 74, and a common potential drive circuit 75. The light source unit 50 also includes, for example, a light emitting diode element 51r, a light emitting diode element 51g, and a light emitting diode element 51b. As shown in FIG. 3, the substrate 10 has a larger area than the substrate 20, so that the drive circuit 70 is provided on the substrate 10.

The signal processing circuit 71 includes an input signal analysis unit (input signal analysis circuit) 711, a storage unit (storage circuit) 712, and a signal adjustment unit 713. The display panel P1 has a control unit 90 having a control circuit for controlling image display, and an input signal VS is inputted to an input signal analysis unit 711 of the signal processing circuit 71 from the control unit 90 via a wiring path such as a unshown flexible wiring board. The input signal analysis unit 711 performs an analysis processing based on the input signal VS inputted from outside to generate an input signal VCS. The input signal VCS is, for example, a signal that determines what gradation value is given to each pixel PIX (see FIG. 3) of the display panel P1 (see FIG. 3) based on the input signal VS.

The signal adjustment unit 713 generates an input signal VCSA from the input signal VCS inputted from the input signal analysis unit 711. The signal adjustment unit 713 sends the input signal VCSA to the pixel control circuit 72, and sends a light source control signal LCSA to the light source control unit 52. The light source control signal LCSA is, for example, a signal containing information on amounts of light of the light source unit 50 and the light source unit 60 that are set according to the inputted gradation value to the pixel PIX.

The pixel control circuit 72 generates a horizontal drive signal HDS and a vertical drive signal VDS based on the input signal VCSA. For example, in the present embodiment, driving is performed by a field sequential method, so that the horizontal driving signal HDS and the vertical driving signal VDS are generated for each color that the light source unit 50 and the light source unit 60 can emit. The gate drive circuit 73 sequentially selects a gate line GL of the display panel P1 (see FIG. 3) within one vertical scanning period based on the horizontal drive signal HDS. Order of selection of the gate line GL is arbitrary. As shown in FIG. 3, a plurality of gate lines (signal lines) GL extend in the X direction and are arranged along the Y direction.

Based on the vertical drive signal VDS, the source drive circuit 74 supplies a gradation signal to each source line SL of the display panel P1 (see FIG. 3) within one horizontal scanning period according to the outputted gradation value of each pixel PIX (see FIG. 3). As shown in FIG. 3, a plurality of source lines (signal lines) SL extend in the Y direction and are arranged along the X direction. One pixel PIX is formed at each intersection of the gate line GL and the source line SL. A switching element Tr (see FIG. 6) is formed at each of portions at which the gate lines GL and the source lines SL are intersected. The plurality of gate lines GL and the plurality of source lines SL shown in FIGS. 3 and 6 correspond to a plurality of signal lines that transmit drive signals for driving the liquid crystal LQ shown in FIG. 4 (and FIG. 5).

For example, a thin film transistor is used as the switching element Tr shown in FIG. 6. A type of thin film transistor is not particularly limited, and the following can be exemplified, for example. When classified according to a position of the gate, bottom-gate type transistors and top-gate type transistors can be given. In addition, when classified according to the number of gates, single-gate thin film transistors and double-gate thin film transistors are given. One of the source electrode and the drain electrode of the switching element Tr is connected to the source line SL, the gate electrode is connected to the gate line GL, and the other of the source electrode and the drain electrode is connected to one end of capacitor of a polymer dispersed liquid crystal LC (liquid crystal LQ shown in FIGS. 4 and 5). The capacitor of the polymer-dispersed liquid crystal LC has one end connected to the switching element Tr via the pixel electrode PE, and the other end connected to a common potential line CML via the common electrode CE. A holding capacitor HC is generated between the pixel electrode PE and a holding capacitor electrode electrically connected to the common potential line CML. Incidentally, the common potential line CML is supplied from a common potential driving circuit 75.

<Problem of Transparent Display Apparatus>

Next, a problem(s) of the transparent display apparatus and its solution will be explained. The display panel P2 shown in FIG. 5 has a structure in which the light source unit 50 is arranged at a position not overlapping with the display region DA in order to ensure visible light transmittance on the front and rear surfaces. In addition, the display panel P2 has a mechanism to deliver light to a side surface 20s2 opposite to a side surface 20s1 facing the light source unit 50 by utilizing a difference in refractive index between the substrates 10 and functioning as light guide members and a surrounding air layer to reflect the light-source light L1.

However, in the case of the structure of the display panel P2, confirmed is a phenomenon in which brightness of a region far from the light source unit 50 is lower than brightness of a region close to the light source unit 50 in the display region DA. This phenomenon is hereinafter referred to as a luminance gradient phenomenon. The inventor of the present application has studied a technique for reducing the luminance gradient phenomenon. First, in the luminance gradient phenomenon, since the luminance in the region near the light source unit 50 becomes relatively high, it is conceivable that in FIG. 5, a method of providing another light source at a position facing the side surface 20s2 opposite to the side surface 20s1 in addition to the light source unit 50 arranged at a position facing the side surface 20s1.

However, in a case of this method, for example, the light source units are arranged on at least two of four sides of the rectangular display region. Since the light source unit has no visible light transmittivity, the background 101 shown in FIG. 2 cannot be visually recognized on the side at which the light source nit is arranged. Considering the visibility of the background, which is a characteristic of the transparent display apparatus, the fewer the number of sides at which the light source units are arranged, the better.

Therefore, as a result of further studies, the inventor of the present application found the structure shown in FIG. 4. The display panel (display apparatus) P1 shown in FIG. 4 has: the substrate 10 having the front surface 10f and the rear surface 10b opposite to the front surface 10f; the substrate 20 having the rear surface 20b facing the front surface 10f and the front surface 20b opposite to the rear surface 20b; and the liquid crystal layer LQL arranged between the front surface 10f of the substrate 10 and the rear surface 20b of the substrate 20. This point is the same as the display panel P2 shown in FIG. 5. In addition to the above, the display panel P1 shown in FIG. 4 has: the light guide plate 30 bonded and fixed on the rear surface 20b of the substrate 10 via an adhesive layer 31; the light guide plate 40 bonded and fixed on the front surface 20f of the substrate 20 via an adhesive layer 41; the light source unit 60 having a plurality of light emitting diode elements 61, arranged on the rear surface 10b of the substrate 10, and arranged at a position opposite to the side surface 30s of the light guide plate 30; and the light source unit 50 having a plurality of light emitting diode elements 51, arranged on the front surface 10f of the substrate 10, and arranged at a position opposite to the side surface 40s1 of the light guide plate 40. Also, the refractive index of one of the adhesive layer 41 and the adhesive layer 31 is lower than the refractive index of the other. The side surface 30s1 of the light guide plate 30 and the side surface 40s1 of the light guide plate 40 are on the same side in the first direction (the Y direction in the example shown in FIG. 4).

As can be seen by comparing FIGS. 4 and 5, the display panel P1 (see FIG. 4) differs from the display panel P2 (see FIG. 5) in that it includes the light guide plate 30 and the light guide plate 40. Further, the display panel P1 differs from the display panel P2 in that it further includes the light source unit 60 in addition to the light source unit 50. The light guide plate 30 has a front surface 30f facing the rear surface 10b of the substrate 10 and a rear surface 30b opposite to the front surface 30f. The light guide plate 30 also has a side surface 30s1 facing the light source 60 and a side surface 30s2 located on an opposite side of the side surface 30s1. The light guide plate 30 is bonded and fixed to the substrate 10 via an adhesive layer 31. At least in the display region DA, ae gap between the light guide plate 30 and the substrate 10 is filled with the adhesive layer 31. In the example shown in FIG. 4, the adhesive layer 31 is adhered to the entire front surface 30f of the light guide plate 30. The light-source light L60 emitted from the light source unit 60 enters the light guide plate 30 from the side surface 30s1 and travels toward the side surface 30s2 while being reflected.

Similarly, the light guide plate 40 has a rear surface 40b facing the front surface 20f of the substrate 20 and a front surface 40f opposite to the rear surface 40b. The light guide plate 40 also has a side surface 40s1 facing the light source 50 and a side surface 40s2 located on an opposite side of the side surface 40s1. The light guide plate 40 is bonded and fixed to the substrate 20 via an adhesive layer 41. At least in the display region DA, a gap between the light guide plate 40 and the substrate 20 is filled with the adhesive layer 41. In the example shown in FIG. 4, the adhesive layer 41 is adhered to the entire front surface 40f of the light guide plate 40. The light-source light L50 emitted from the light source unit 50 enters the light guide plate 40 from the side surface 40s1 and travels toward the side surface 40s2 while being reflected.

Each of the adhesive layer 31 and the adhesive layer 41 is made of a transparent resin material that can transmit visible light. As the visible-light-transmittivity adhesive layer 31 and adhesive layer 41, exemplified can be a transparent adhesive sheet called an OCA (Optical Clear Adhesive) formed in a sheet shape, an OCR (Optical Clear Resin) that is used by curing a liquid transparent adhesive, and the like. However, as described above, the refractive index of the adhesive layer 31 and the refractive index of the adhesive layer 41 are not the same. For example, in the example shown in FIG. 4, the refractive index of the adhesive layer 31 is lower than the refractive index of the adhesive layer 41. There are various modification examples of the refractive indices of the substrate 10, the substrate 20, the light guide plate 30, and the light guide plate 40, but these refractive indices are, for example, about 1.5. The refractive index of the adhesive layer 41 is close to the refractive index of the light guide plate 40, for example, about 1.47 to 1.5, and is 1.474 in the present embodiment. In this case, most of the light-source light L50 travels toward the substrate 20 near the side surface 40s1 without being reflected at the interface between the light guide plate 40 and the adhesive layer 41. As a result, less light-source light L50 reaches the region near the side surface 40s2. That is, focusing only on the light-source light L50 from the light source unit 50, this is on a state where a luminance gradient phenomenon occurs.

Meanwhile, the refractive index of the adhesive layer 31 is lower than the refractive index of the adhesive layer 41, for example about 1.0 to 1.41. In this case, since the light-source light L60 is likely to be reflected at the interface between the light guide plate 30 and the adhesive layer 31, a large amount of light-source light L60 tends to travel close to the side surface 30s2. The light-source light L60 traveling from the side surface 40s1 and reflected light reflected by the side surface 40s2 exist in a region near the side surface 30s2, and part of these lights pass through the interface between the light guide plate 30 and the adhesive layer 31 and invade the substrate 10. As a result, focusing only on the light-source light L60 from the light source unit 60, more light enters the liquid crystal layer LQL in the region close to the side surface 30s2 than that in the region close to the side surface 30s1.

Here, when a behavior of the light-source light L50 and a behavior of the light-source light L60 are combined, as a result, the luminance of the entire display region DA is improved toward uniformity. In regions near the side surface 30s1 and the side surface 40s1 among the display region DA, the brightness is defined mainly by the light-source light L50 emitted from the light source unit 50. Meanwhile, in regions close to the side surface 30s2 and the side surface 40s2, the brightness is mainly defined by the light-source light L60 emitted from the light source unit 60. A light intensity of the light-source light L50 and a light intensity of the light-source light L60 do not necessarily have to be the same. For example, the light intensity of the light-source light 60 passing through the adhesive layer 31 that is relatively easily reflective can be stronger than the light intensity of the light-source light L50. By this way, adjusting the light intensity of the light-source light L50 and the light intensity of the light-source light L60 makes it is possible to reduce the luminance gradient phenomenon in the entire display region DA.

Figure 7:
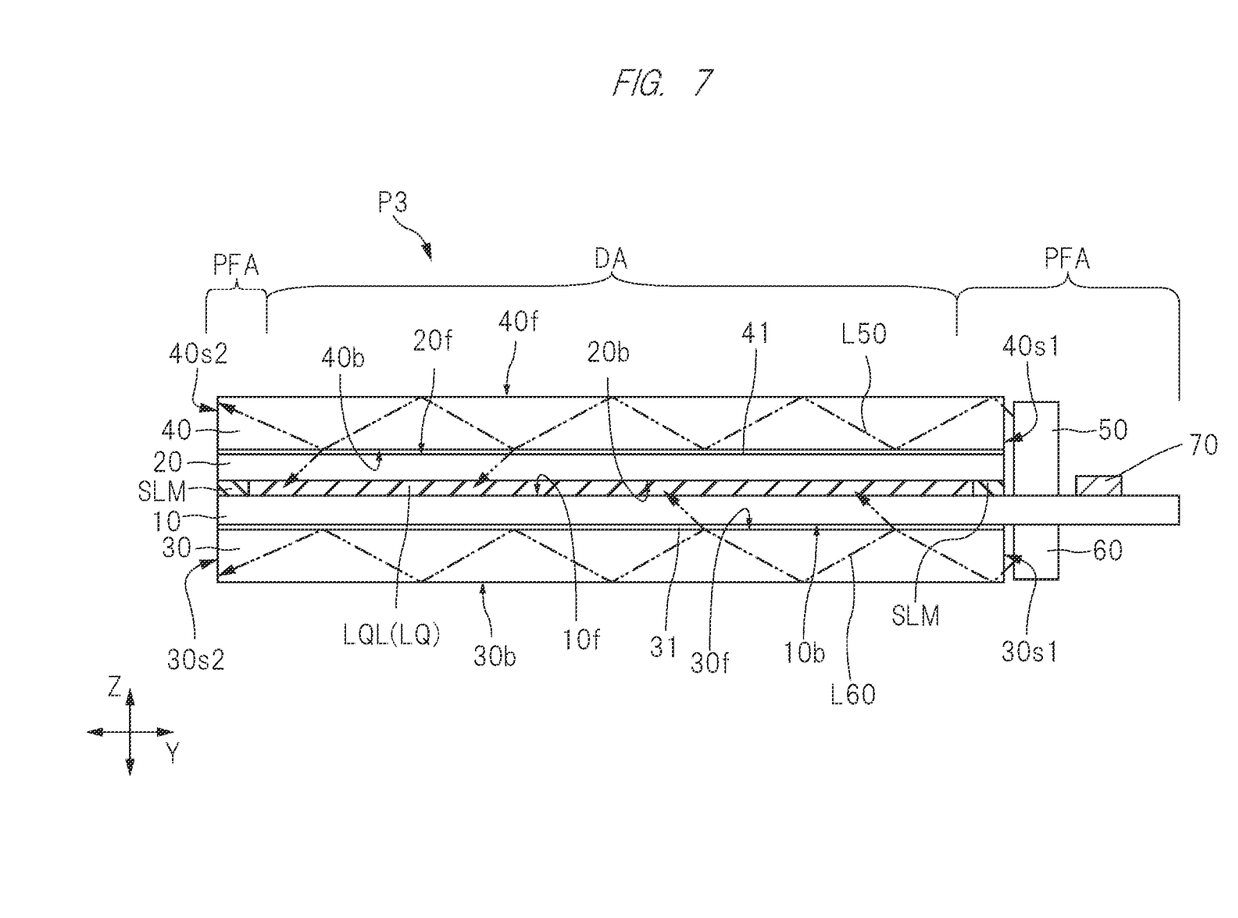
FIG. 7 is a sectional view showing a modification example to FIG. 4.

In FIG. 4, as an example, the embodiment in which the refractive index of the adhesive layer 31 is lower than the refractive index of the adhesive layer 41 has been taken up and explained, but it is not limited to the embodiment shown in FIG. 4. For example, a display panel (display apparatus) P3 shown in FIG. 7 is a modification example in a case where the refractive index of the adhesive layer 41 is lower than the refractive index of the adhesive layer 31. FIG. 7 is a sectional view showing a modification example to FIG. 4. In the case of the display panel P3 shown in FIG. 7, the adhesive layer 41 has a low refractive index, for example, about 1.0 to 1.41. Therefore, most of the light-source light L50 travels close to the side surface 40s2 and penetrates from the substrate 20 into the liquid crystal layer LQL. Meanwhile, the refractive index of the adhesive layer 31 is close to the refractive index of the light guide plate 40, for example, about 1.47 to 1.5 and the present embodiment is 1.474. Therefore, most of the light-source light L60 passes through the substrate 10 near the side surface 30s1 and enters the liquid crystal layer LQL. Even in the case of the display panel P3, the luminance gradient phenomenon can be reduced in the same manner as the display panel P1 shown in FIG. 4.

Also, as described above, the side surface 30s1 of the light guide plate 30 and the side surface 40s1 of the light guide plate 40 are on the same side in a first direction (Y direction in the example shown in FIG. 4). In other words, each of the light source unit 50 and the light source unit 60 is arranged along the same side among the plurality of sides (four sides in the example shown in FIG. 3) of the display region DA. Consequently, for example, the light source unit 50 and the light source unit 60 are collectively arranged on one of the four sides of the rectangular display region. Therefore, the background 101 shown in FIG. 2 can be visually recognized on the other three sides where the light source unit is not arranged. As a result, the visibility of the background, which is a feature of the transparent display apparatus, can be improved.

Incidentally, although illustration is omitted, as another modification example to FIG. 4, the light source unit 50 and the light source unit 60 may not overlap each other. For example, when the light guide plate 30 shown in FIG. 4 extends up to a position of overlapping the light source unit 50 and the light source unit 60 is arranged at a position of overlapping the drive circuit 70, the light source unit 50 and the light source unit 60 do not overlap each other. Even in a case of this modification example, the light source unit 50 and the light source unit 60 are collectively arranged on one side of the display region DA, so that the same effect as that of the display panel P1 shown in FIG. 4 can be obtained in terms of visibility of the background.

Figure 8:
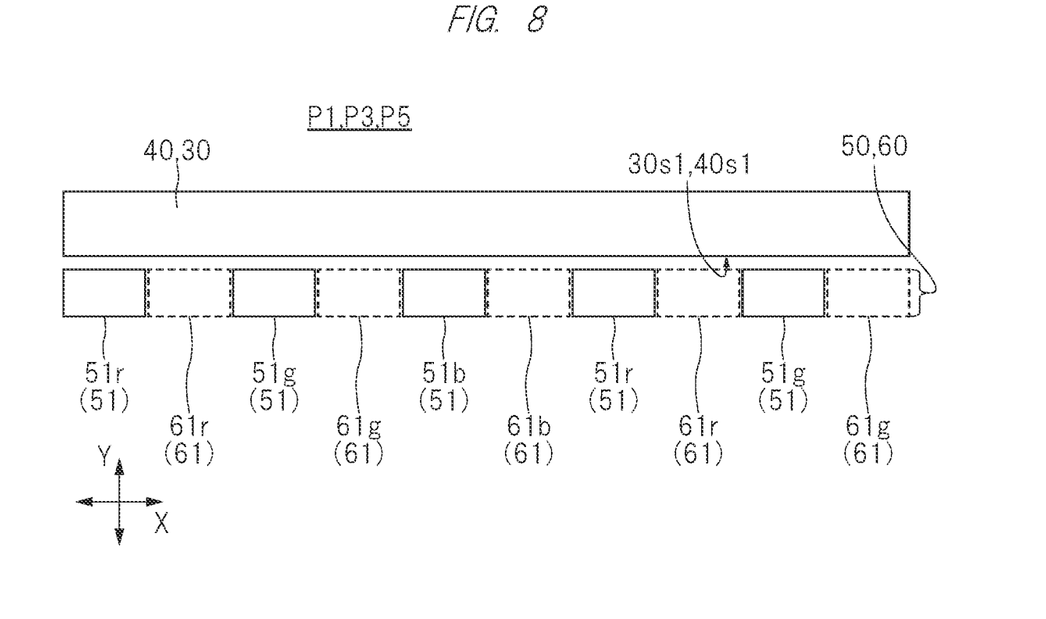
FIG. 8 is an enlarged transparent plan view in which an inside of a light source portion provided in the display panel shown in FIG. 3 is viewed from its front side.

However, from the viewpoint of facilitating adjustment of brightness balance of the display panel, it is preferred that the light source unit 60 and the light source unit 50 overlap each other in a transmissive planar view viewed from the light guide plate 40 side. When the light source unit 60 and the light source unit 50 overlap each other, a distance from the light source unit 50 to the light guide plate 40 and a distance from the light source unit 60 to the light guide plate 30 can be approximately the same. In this case, the brightness balance adjustment of the display panel P1 which uses the light source unit 50 and the light source unit 60 is facilitated. Here, "the light source unit 50 and the light source unit 60 overlap each other" is defined as follows. As shown in FIG. 8, which will be described later, the light source unit 50 includes a plurality of light emitting diode elements 51 arranged in the X direction intersecting the Y direction. The light source unit 50 includes a plurality of light emitting diode elements 51 and spaces between the adjacent light emitting diode elements 51. Similarly, the light source unit 60 includes a plurality of light emitting diode elements 61 arranged in the X direction. The light source unit 60 includes a plurality of light emitting diode elements 61 and spaces between the adjacent light emitting diode elements 61. Therefore, when expressing that "the light source unit 50 and the light source unit 60 overlap each other", in addition to a case where the light emitting diode elements 51 and the light emitting diode elements 61 overlap, the expression includes: a case where the space between the adjacent light emitting diode elements 51 overlap the light emitting diode element 61; a case where the space between the adjacent light emitting diode elements 61 overlaps the light emitting diode element 51; a case where the space between the adjacent light emitting diode elements 51 overlaps the space between the adjacent light emitting diode element 61. For example, in the examples shown in FIGS. 8 and 9, which will be described later, the light emitting diode element 51 and the light emitting diode element 61 do not overlap each other, but the space between the adjacent light emitting diode elements 51 overlaps the light emitting diode element 61, so that it is expressed as "the light source unit 50 and the light source unit 60 overlap each other".

Figure 9:
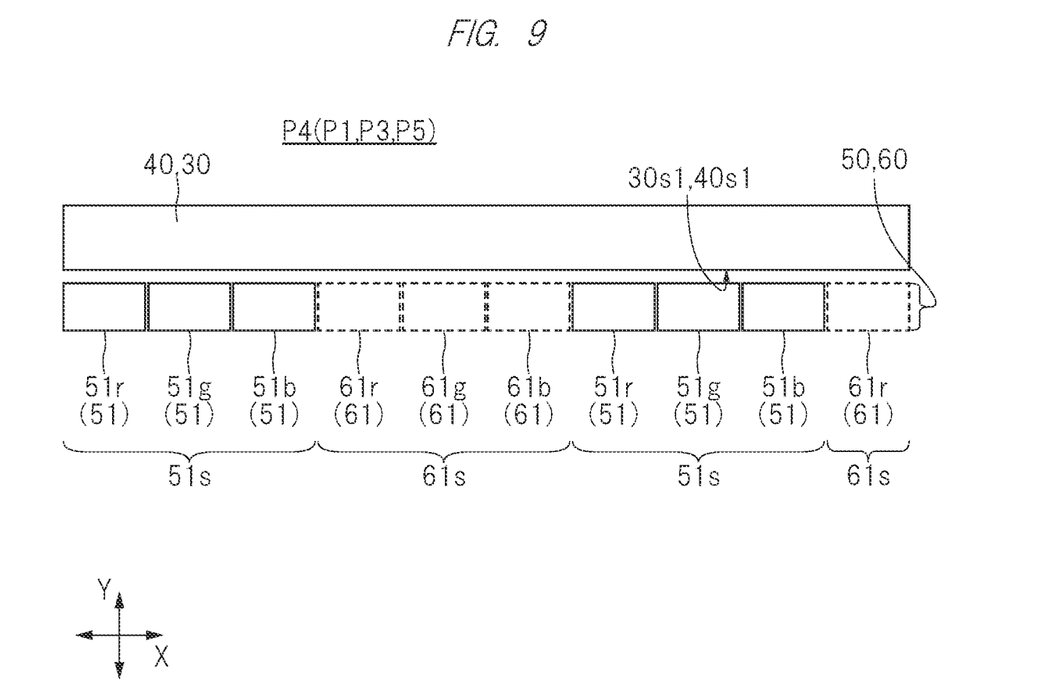
FIG. 9 is an enlarged transparent plan view showing a modification example to FIG. 8.

Next, a more preferable embodiment will be explained. FIG. 8 is an enlarged transparent plan view of an inside of the light source unit provided in the display panel shown in FIG. 3 as viewed from the front surface side. FIG. 9 is an enlarged transparent plan view showing a modification example to FIG. 8. In FIGS. 8 and 9, internal parts of the light source unit 50 mounted on the front surface 10f of the substrate 10 in FIG. 4 are shown by solid lines. Incidentally, FIG. 8 is an explanatory diagram of a detailed structure of the display panel P1 described with reference to FIG. 4, the display panel P3 described with reference to FIG. 7, or a display panel P5 shown in FIG. 10 and described later. Meanwhile, FIG. 9 is a modification example to FIG. 8. Therefore, although the display panel P4 is shown in FIG. 9, it is possible by combining and applying the display panel P1 described with reference to FIG. 4, the display panel P3 described with reference to FIG. 7, or the display panel P5 illustrated in FIG. 10 and described later.

As shown in FIG. 8, the display panel P1 includes a plurality of light emitting diode elements 51 spaced apart from each other along a first direction (X direction in the example shown in FIG. 8), and a plurality of light emitting diode elements 61 spaced apart from each other along the first direction (X direction in the example shown in FIG. 8). In the example shown in FIG. 8, in a transparent plan view from the light guide plate side, the plurality of light emitting diode elements 51 and the plurality of light emitting diode elements 61 are alternately arranged along the first direction (the X direction in FIG. 8), respectively. As shown in FIG. 8, by alternately arranging the light emitting diode elements 51 and the light emitting diode elements 61 in the transparent plane view, it is easy to adjust the balance of the brightness in the entire display region DA (see FIG. 4). As described above, the display panel shown in FIG. 8 may be, besides the display panel P1 described with reference to FIG. 4, the display panel P3 described with reference to FIG. 7 or the display panel P5 described with reference to FIG. 10 and described later.

Further, in a case of the display panel P4 shown in FIG. 9, which is a modification example to FIG. 8, the plurality of light emitting diode elements 61 include: a light emitting diode element 61r (for example, first-color light emitting diode element) capable of emitting light of first color (for example, red); a light emitting diode element 61g (for example, second-color light emitting diode element) capable of emitting light of second color (for example, green); and a light emitting diode element 61b (for example, third-color light emitting diode element) capable of emitting light of third color (for example, blue), and include a plurality of light emitting diode element sets 61s arranged adjacent to each other along the first direction (X direction in FIG. 9). The plurality of light emitting diode elements 51 include: a light emitting diode element (first-color light emitting diode element) 51r capable of emitting light of first color (for example, red); a light emitting diode element (second-color light emitting diode element) 51g capable of emitting light of second color (for example, green); and a light emitting diode element (third-color light emitting diode element) 51b capable of emitting light of third color (for example, blue), and include a plurality of light emitting diode element sets 51s arranged adjacent to each other along the first direction (X direction in FIG. 9). In a transmissive plan view viewed from the light guide plate 40 side, the plurality of light emitting diode element sets 61s and the plurality of light emitting diode element sets 51s are arranged alternately along the first direction (X direction in FIG. 9), respectively. As described above, the display panel shown in FIG. 9 may be, besides the display panel P1 described with reference to FIG. 4, the display panel P3 described with reference to FIG. 7 or the display panel P5 shown in FIG. 10 and described later.

White light is realized by mixing red, green, and blue colors. Therefore, in each of the light emitting diode element set 51s and the light emitting diode element set 61s, by arranging the light emitting diode elements of respective colors, which become sources of white color, adjacent to each other, white light can be easily adjusted.

Figure 10:
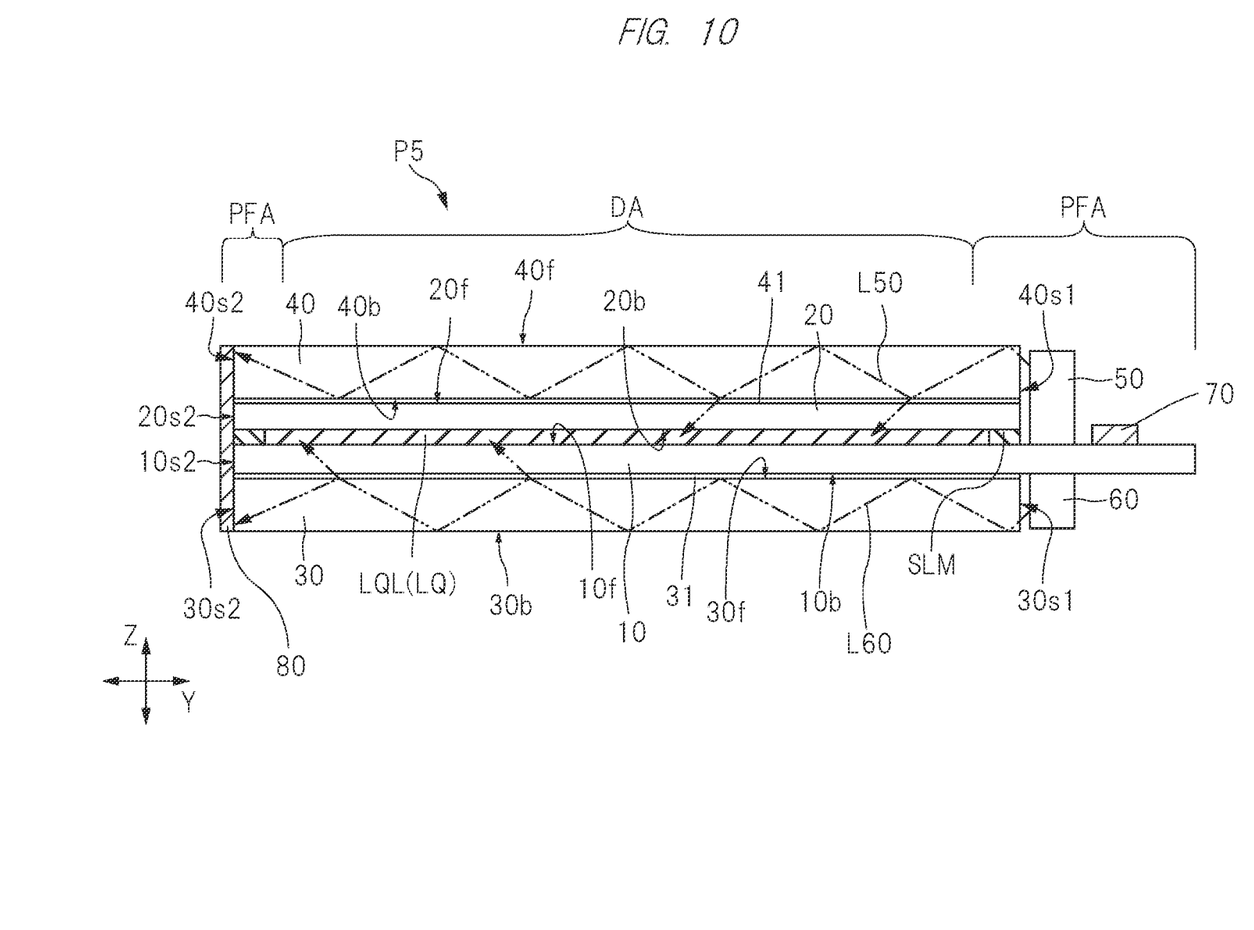
FIG. 10 is a sectional view showing another modification example to FIG. 4.

FIG. 10 is a sectional view showing another modification example to FIG. 4. A display panel (display apparatus) P5 shown in FIG. 10 differs in that it further includes a light source unit 60 and a reflective film 80 provided on an opposite side of the light source unit 50 in addition to a configuration of the display panel P1 shown in FIG. 4. The light guide plate 30 has a side surface 30s2 opposite to the side surface 30s1, and the light guide plate 40 has a side surface 30s2 opposite to the side surface 40s1. The substrate 10 has a side surface (substrate side surface) 10s1, and the substrate 20 has a side surface (substrate side surface) 20s2. The reflective film 80 is in close contact with the side surface 30s2, the side surface 40s2, the side surface 10s2, and the side surface 20s2.

If the side surface 30s2 and the side surface 40s2 are smooth surfaces, the light-source light L50 is reflected by the side surface 40s2 that is an interface between the light guide plate 40 and the air layer, and the light source light L60 is reflected by the side surface 30s2 that is an interface between the light guide plate 30 and the air layer. However, from the viewpoint of reflecting light more reliably, it is preferable to bring the reflective film 80 into close contact with the side surface 30s2, the side surface 40s2, the side surface 10s2, and the side surface 20s2 as in the display panel P5. This makes it possible to efficiently utilize for image display the light emitted from the light source unit 50 and the light source unit 60.

Incidentally, in the display panel P5 shown in FIG. 10, the embodiment of the arrangement of the light emitting diode elements 51 and the light emitting diode elements 61 described with reference to FIGS. 8 and 9 can be applied.

As described above, the embodiments and their representative modification examples have been described. However, the above-mentioned technique is applicable to various modification examples other than the exemplified modification examples. For example, any of the above-mentioned modification examples may be combined.

Within the scope of the idea of the present invention, those skilled in the art can conceive of various modification examples and revision examples, and it is understood that these modification examples and revision examples also fall within the scope of the present invention. For example, additions, deletions, or design changes of components, or additions, omissions, or changes of conditions to the above-described embodiments by those skilled in the art are also included in the scope of the present invention as long as having the gist of the present invention.

INDUSTRIAL APPLICABILITY

The present invention can be used for display apparatuses and electronic components incorporating the display apparatuses.

What is claimed is:

1. A display apparatus comprising:
a first substrate having a first front surface and a first rear surface opposite to the first front surface;
a second substrate having a second rear surface facing the first front surface and a second front surface opposite to the second rear surface;
a liquid crystal layer disposed between the first front surface of the first substrate and the second rear surface of the second substrate;
a first light guide plate bonded and fixed to the first rear surface of the first substrate via a first adhesive layer;
a second light guide plate bonded and fixed to the second front surface of the second substrate via a second adhesive layer;
a first light source unit having a plurality of first light emitting diode elements, arranged on the first rear surface of the first substrate, and arranged at a position facing a first side surface of the first light guide plate; and
a second light source unit having a plurality of second light emitting diode elements, arranged on the first front surface of the first substrate, and arranged at a position facing a second side surface of the second light guide plate,
wherein refractive index of one of the first adhesive layer and the second adhesive layer is lower than the refractive index of the other, and
the first side surface of the first light guide plate and the second side surface of the second light guide plate are on the same side in a first direction.

2. The display apparatus according to claim 1,
wherein the plurality of first light emitting diode elements are arranged apart from each other along a second direction that intersects with the first direction,
the plurality of second light emitting diode elements are arranged apart from each other along the second direction, and
in a transmitted plan view viewed from a side of the second light guide plate, the plurality of first light emitting diode elements and the plurality of second light emitting diode elements are alternately arranged along the first direction, respectively.

3. The display apparatus according to claim 1,
wherein the plurality of first light emitting diode elements are arranged apart from each other along a second direction that intersects with the first direction,
the plurality of second light emitting diode elements are arranged apart from each other along the second direction,
the plurality of first light emitting diode elements include a first-color light emitting diode element capable of emitting light of first color, a second-color light emitting diode element capable of emitting light of second color, and a third-color light emitting diode element capable of emitting light of third color, and include a plurality of first light emitting diode element sets arranged adjacent to each other along the second direction,
the plurality of second light emitting diode elements include a first-color light emitting diode element capable of emitting light of the first color, a second-color light emitting diode element capable of emitting light of the second color, and a third-color light emitting diode element capable of emitting light of the third color, and include a plurality of second light emitting diode element sets arranged adjacent to each other along the second direction, and
in a transmitted plan view viewed from a side of the second light guide plate, the plurality of first light emitting diode element sets and the plurality of second light emitting diode element sets are alternately arranged along the second direction, respectively.

4. The display apparatus according to claim 1,
wherein refractive index of the first adhesive layer is lower than refractive index of the second adhesive layer.

5. The display apparatus according to claim 1,
wherein refractive index of the second adhesive layer is lower than refractive index of the first adhesive layer.

6. The display apparatus according to claim 1, further comprising a reflective film provided on an opposite side of the first light source unit and the second light source unit,
wherein the first light guide plate has a third side surface on an opposite side of the first side surface,
the second light guide plate has a fourth side surface on an opposite side of the second side surface,
the first substrate has a first substrate side surface,
the second substrate has a second substrate side surface, and
the reflective film is in close contact with the third side surface, the fourth side surface, the first substrate side surface, and the second substrate side surface.

7. The display apparatus according to claim 6,
wherein the plurality of first light emitting diode elements are arranged apart from each other along a second direction that intersects with the first direction,
the plurality of second light emitting diode elements are arranged apart from each other along the second direction, and
in a transmission plan view viewed from the second light guide plate side, the plurality of first light emitting diode elements and the plurality of second light emitting diode elements are alternately arranged along the second direction.

8. The display apparatus according to claim 6,
wherein the plurality of first light emitting diode elements are arranged apart from each other along a second direction that intersects with the first direction,
the plurality of second light emitting diode elements are arranged apart from each other along the second direction,
the plurality of first light emitting diode elements include a first-color light emitting diode element capable of emitting light of first color, a second-color light emitting diode element capable of emitting light of second color, and a third-color light emitting diode element capable of emitting light of third color, and include a plurality of first light emitting diode element sets arranged adjacent to each other along the second direction,
the plurality of second light emitting diode elements include a first-color light emitting diode element capable of emitting light of the first color, a second-color light emitting diode element capable of emitting light of the second color, and a third-color light emitting diode element capable of emitting light of the third color, and including a plurality of second light emitting diode element sets arranged adjacent to each other along the second direction, and in a transmitted plan view viewed from the second light guide plate side, the plurality of first light emitting diode element sets and the plurality of second light emitting diode element sets are alternately arranged along the second direction, respectively.

* * * * *